2,750,364
Patented June 12, 1956

2,750,364

COMPOUNDS DERIVABLE FROM DEHYDRO-ABIETONITRILE

James Minn, Newark, Del., assignor to Hercules Powder Company, Wilmington, Del., a corporation of Delaware No Drawing. Application April 6, 1955,
Serial No. 499,745

5 Claims. (Cl. 260—97)

The present invention relates to valuable and novel compounds derivable from dehydroabietonitrile and to a process for their preparation.

Dehydroabietonitrile is a commercially available compound derivable from dehydrogenated rosin. Other investigators have found that the cyano group of dehydroabietonitrile can be converted to an acetyl group by reaction with a Grignard reagent and that the product of this reaction is 1-acetyl-1,2,3,4,4a,9,10,10a-octahydro-7-isopropyl-1,4a-dimethylphenanthrene which is itself a valuable compound. For convenience, it will be hereinafter referred to as the 1-acetyl compound.

In accordance with the present invention, it has been found that valuable new compounds can be prepared starting from the 1-acetyl compound. These compounds of the invention have the formula

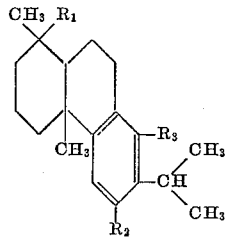

wherein $R_1$ is a radical selected from the group consisting of acetyl and hydroxyethyl; $R_2$ is a radical selected from the group consisting of acetyl, hydroxyethyl and hydrogen; and $R_3$ is a radical selected from the group consisting of acetyl, hydroxyethyl and hydrogen, one of $R_2$ and $R_3$ being hydroxyethyl and the other being hydrogen when $R_1$ is hydroxyethyl, and one of $R_2$ and $R_3$ being acetyl and the other being hydrogen when $R_1$ is acetyl.

In the preferred method of preparing the compounds of the invention, the 1-acetyl compound (obtained, for example, from dehydroabietonitrile by reaction with a methyl Grignard reagent) is acetylated by reaction with acetyl chloride in a Friedel-Crafts ketone synthesis to form a mixture of 1,6-diacetyl-1,2,3,4,4a,9,10,10a-octahydro-7-isopropyl-1,4a-dimethylphenanthrene and 1,8-diacetyl-1,2,3,4,4a,9,10,10a-octahydro - 7 - isopropyl-1,4a, dimethylphenanthrene. Each of these diacetyl compounds can then be reduced by means of an alkali metal aluminum hydride to convert the acetyl groups into hydroxyethyl groups.

In order to illustrate the invention in more detail, the following examples are presented. Parts and percentages are by weight unless otherwise specified.

Example 1

A methyl Grignard reagent was prepared in conventional manner by the reaction of 16.12 parts of magnesium and 95 parts of methyl iodide in anhydrous ether. To the solution of methyl Grignard reagent so obtained there was added 140.5 parts of dehydroabietonitrile dissolved in approximately 1350 parts of benzene. The temperature was raised and the ether distilled off until a reflux temperature of 75–77° C. was reached. Refluxing was continued for 20 hours, the mixture was then cooled and about 550 parts of 5% hydrochloric acid was added slowly with stirring. After stirring for 30 minutes, the mixture was diluted with 1500 parts of ether and allowed to separate in two layers, an ether-benzene layer and an aqueous acid layer. The ether-benzene layer was washed thoroughly with dilute hydrochloric acid until no deepening of color was observed in the aqueous layer from the washing step. The ether-benzene layer was then discarded and the acid washes combined and heated to approximately 100° C. for 3 hours with stirring. The mixture was then cooled, extracted with ether and the ether layer washed with water, dried and evaporated. This yielded 8.41 parts of a solid ketonic residue.

Ten parts of the solid ketonic residue was dissolved in about 48 parts of absolute alcohol containing approximately 10.5 parts of acetic acid and 10 parts of Grignard's reagent (trimethylaminoacethydrazide hydrochloride) and heated under reflux for 4 hours. The reaction mixture was cooled and poured into 240 parts of ice water containing 6 parts of sodium hydroxide. This aqueous mixture was extracted 6 times with 175 part portions of ethyl ether and the extracts discarded. The aqueous layer was made strongly acid by the addition of 48 parts of concentrated hydrochloric acid. After standing for 1.5 hours, the mixture was extracted with ether and the ether layer washed with water, dried and evaporated to dryness yielding 3.8 parts of solid residue. The procedure was repeated with the remaining crude ketonic residue so that a total of 26.9 parts of solid residue was obtained.

The ketonic residue was next distilled which yielded 25 parts of a colorless material boiling at 165–168° C. at 0.1 mm. pressure. This material was recrystallized from ethanol yielding 22.6 parts of white crystalline material ketone melting at 43–44° C. *Analysis.*—Calculated for $C_{21}H_{30}O$ (the 1-acetyl compound): C, 84.51; H, 10.13. Found: C, 84.68; H, 10.33.

In a reaction vessel equipped with stirrer and condenser there was dissolved 17.88 parts of the 1-acetyl compound in 120 parts of nitrobenzene. To this solution there was added 5.1 parts of acetyl chloride and the mixture was stirred at 0–5° C. Next, 16.55 parts of anhydrous aluminum chloride was added slowly. Stirring was continued at 0–5° C. for 2 hours and the mixture was permitted to stand at 5° C. for 40 hours.

The reaction mixture was next poured into another vessel containing ice and approximately 60 parts of concentrated HCl. The mixture was then steam distilled. The residue was extracted with ether and the ether extract washed with water, aqueous sodium bicarbonate, with water again and finally dried over sodium sulfate. Evaporation of the ether yielded 19.78 parts of a dark brown oil which was dissolved in 25 parts of hexane and chromatographically separated on a column of basic alumina to give the following separation:

| Fraction | Eluting Solvent (parts) | Fraction Weight (parts) | Remarks |
|---|---|---|---|
| 1–9 | 2,250 hexane | 6.95 | yellow oil. |
| 10, 11 | 1,050 hexane | 1.17 | crystals. |
| 12, 13 | ----do---- | .80 | Do. |
| 14, 15 | ----do---- | .72 | Do. |
| 16, 18 | 1,455 hexane:benzene (3:2 by volume). | 4.38 | Do. |
| 19, 22 | 770 hexane:benzene (1:1 by volume) | 4.18 | Do. |
| 23 | 270 hexane:benzene (1:1 by volume) | 0.37 | oil. |
| 24, 25 | 2,000 benzene | 0.80 | crystals. |
|  |  | 19.37 |  |

Samples from fractions 10–22 were recrystallized from isooctane to give long white needles melting at 114–115°

C. A sample of fractions 12 and 13 was recrystallized to give crystals of the same melting point which analyzed as follows. Found: C, 81.35; H, 9.86; calculated for $C_{23}H_{32}O_2$: C, 81.13; H, 9.47. This product was identified as 1,6-diacetyl-1,2,3,4,4a,9,10,10a-octahydro-7-isopropyl-1,4a-dimethylphenanthrene.

Fractions 24 and 25 were decolorized with activated carbon and then recrystallized from isooctane to give white prisms melting at 170–171° C. *Analysis.*—Calculated for $C_{23}H_{32}O_2$: C, 81.13; H, 9.47. Found: C, 80.76; H, 9.64. This product was identified as 1,8-diacetyl-1,2,3,4,4a,9,10,10a - octahydro-7-isopropyl-1,4a-dimethylphenanthrene.

*Example 2*

A solution of 3.75 parts of the 1,6-diacetyl compound prepared as above in dry ether was added slowly to a stirred suspension of 3 parts of lithium aluminum hydride in 175 parts of ether. After stirring this reaction mixture for 66 hours, approximately 13.5 parts of ethyl acetate was added to destroy the excess lithium aluminum hydride. The lithium aluminum complex was then hydrolyzed by adding approximately 65 parts of 25% sulfuric acid followed by 100 parts of water and then stirring for one hour.

The mixture was then allowed to stand whereby it separated into two layers. The ether layer was washed with water and dried over sodium sulfate. Evaporation of the ether left 3.61 parts of a white solid which crystallized from methanol. Upon recrystallization from isooctane 2.7 parts of white crystals were obtained melting at 125–135° C. *Analysis.*—Calculated for $C_{23}H_{36}O_2$: Percent OH (Zere.) 9.87. Found: Percent OH (Zere.) 9.83 and 9.91. This product was identified as 1,2,3,4,4a-9,10,10a - octahydro-1,6-bis(1-hydroxyethyl)-7-isopropyl-1,4a-dimethylphenanthrene.

As shown in the preceding examples, the 1-acetyl compound derivable by the conversion of the cyano group of dehydroabietonitrile into an acetyl group can be acetylated by reacting it with acetyl chloride in the presence of anhydrous aluminum chloride in a Friedel-Crafts ketone synthesis. This reaction is preferably performed in a suitable Friedel-Crafts solvent such as nitrobenzene, tetrachloroethane or carbon disulfide. The reaction takes place readily at temperatures in the neighborhood of 0° C. and the product comprises approximately 76% of the 1,6-diacetyl compound and approximately 3% of the 1,8-diacetyl compound. The technique of carrying out the reaction will be readily apparent to those skilled in the art from their experience in the Friedel-Crafts acetylation of other compounds.

The reduction of the diacetyl compounds with an alkali metal aluminum hydride is generally carried out in solution. Any inert organic solvent may be used as a medium for the reaction provided that it is a solvent for either one or both of the reactants. Suitable solvents that can be used are diethyl ether, di-n-butyl ether, dioxane, tetrahydrofuran, diethyl carbitol, benzene, hexane, toluene, etc. The reaction should be carried out under anhydrous conditions in order to avoid hydrolysis of the hydride and consequent reductions in yield. Any alkali metal aluminum hydride, such as lithium, sodium, etc., hydrides, may be used for the reduction of the diacetyl compound to the corresponding di(hydroxyethyl) compound but lithium aluminum hydride is preferred. The amount of alkali metal aluminum hydride is preferably within the ratio of from about 0.5 to about 10 moles per mole of diacetyl compound and more preferably is from about 1 to about 5 moles per mole of diacetyl compound. In general, the reaction is carried out at a temperature of from about 0–50° C. and preferably at a temperature of from about 15–35° C.

The alkali metal aluminum complex which is formed as an intermediate in the reaction is hydrolyzed by the addition of water, an acid or a base. Suitable acids for this purpose are the mineral acids such as sulfuric acid, phosphoric acid, etc., but an alkali metal hydroxide such as sodium or potassium hydroxide may be used with equivalent results. The concentration of the hydrolytic agent may be varied over a wide range but, in general, if an acid or base is used, the concentration will be within the range of from about 5–25% by weight of the diacetyl compound. The hydrolysis readily takes place at room temperature. Elevated temperatures are not required but may be used.

The method by which the desired compound is separated from the reaction mixture will, of course, depend upon the type of solvent for carrying out the reaction. If a water-immiscible solvent is used, in which solvent the product is soluble, the product will then be present in the organic phase and can be separated by removal of the solvent. It may also be separated from the reaction mixture by extraction.

The novel compounds produced in accordance with this invention have a variety of interesting applications. Those compounds of the invention that contain two hydroxyethyl groups can be esterified by reaction with an acyl anhydride or an acyl halide and thus it is possible to produce any aliphatic, cycloaliphatic or aromatic acid esters of these new compounds. As illustrative of the foregoing, the 1,6-bis(hydroxyethyl) compound of Example 2 is esterified by refluxing 34.4 parts of the compound in 60.6 parts of acetic anhydride for 12 hours. The solution is cooled, poured into ice water, and stirred until excess acetic anhydride is hydrolyzed. The diacetate of the starting compound is then separated by filtration. This ester is a valuable ingredient of nitrocellulose lacquers wherein it can be used to provide improved adhesion and hardness. For example, a lacquer is formulated from 10 parts RS ¼ sec. nitrocellulose, 10 parts ester gum, and 5 parts of the above ester in a solvent composed of 50 parts toluene, 35 parts butyl acetate, and 15 parts n-butanol. When this lacquer is applied to substrates of steel or wood, the resulting films exhibit better adhesion and greater hardness than those resulting from a similar lacquer containing dibutyl phthalate instead of the ester.

The 1,6-diacetyl compound is also a useful ingredient of nitrocellulose lacquers although the 1,8-diacetyl compound, strangely, is incompatible with nitrocellulose. The latter compound, however, is useful in the preparation of delayed tack adhesives from neoprene. For this purpose, it is dissolved in toluene with an equal amount of neoprene.

All of the compounds of the invention are, furthermore, useful intermediates for the preparation of compounds similar in structure to steroids of known biological activity.

What I claim and desire to protect by Letters Patent is:
1. The compound of the formula

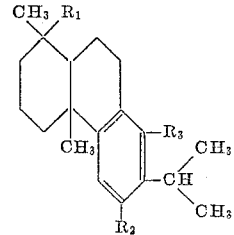

wherein $R_1$ is a radical selected from the group consisting of acetyl and hydroxyethyl; $R_2$ is a radical selected from the group consisting of acetyl, hydroxyethyl and hydrogen; and $R_3$ is a radical selected from the group consisting of acetyl, hydroxyethyl and hydrogen, one of $R_2$ and $R_3$ being hydroxyethyl and the other being hydrogen when $R_1$ is hydroxyethyl, and one of $R_2$ and $R_3$ being acetyl and the other being hydrogen when $R_1$ is acetyl.

2. 1,6-diacetyl - 1,2,3,4,4a,9,10,10a - octahydro - 7 - isopropyl-1,4a-dimethylphenanthrene.

3. 1,8-diacetyl - 1,2,3,4,4a,9,10,10a - octahydro - 7 - isopropyl-1,4a-dimethylphenanthrene.

4. 1,2,3,4,4a,9,10,10a-octahydro - 1,6 - bis(1-hydroxyethyl)-7-isopropyl-1,4a-dimethylphenanthrene.

5. The process which comprises acetylating 1-acetyl-1,2,3,4,4a,9,10,10a-octahydro-7-isopropyl-1,4a - dimethylphenanthrene, isolating from the product of acetylation the compounds 1,6-diacetyl-1,2,3,4,4a,9,10,10a-octahydro-7-isopropyl-1,4a-dimethylphenanthrene and 1,8-diacetyl-1,2,3,4,4a,9,10,10a-octahydro-7-isopropyl-1,4a - dimethylphenanthrene, and converting the acetyl groups of said compounds into hydroxyethyl groups by reduction with an alkali metal aluminum hydride.

No references cited.